United States Patent

Norris

[15] 3,646,880
[45] Mar. 7, 1972

[54] COOKING GRILL
[72] Inventor: James D. Norris, Chicago, Ill.
[73] Assignee: Thermal Process Engineering Company, Chicago, Ill.
[22] Filed: Aug. 21, 1970
[21] Appl. No.: 65,917

[52] U.S. Cl. .............................. 99/349, 99/386, 99/443 C, 219/244, 219/388
[51] Int. Cl. ...................................................... A47j 37/00
[58] Field of Search ................ 219/388, 216, 244; 99/349 X, 99/386, 390, 391, 443 C, 443 R

[56] References Cited

UNITED STATES PATENTS

| | | | |
|---|---|---|---|
| 3,528,361 | 9/1970 | Le Van | 99/349 |
| 2,442,407 | 6/1948 | Gibbons et al. | 219/388 |
| 2,848,332 | 8/1958 | Fabish | 99/443 C X |
| 2,820,131 | 1/1958 | Kodama | 219/388 |
| 3,449,547 | 6/1969 | Goodman et al. | 219/216 |
| 1,664,229 | 3/1928 | Staege | 219/388 |
| 2,070,850 | 2/1937 | Trabold | 99/349 |
| 2,906,847 | 9/1959 | Grevich | 219/244 X |
| 3,180,973 | 8/1965 | Wanielista et al. | 219/388 |
| 3,256,803 | 6/1966 | Nelson | 99/349 |
| 3,513,293 | 5/1970 | Beck | 219/388 |

Primary Examiner—Volodymyr Y. Mayewsky
Attorney—Charles B. Cannon

[57] ABSTRACT

An electrically heated cooking grill for rapidly cooking cheese sandwiches, hamburgers, french toast, bacon, pancakes, crepe suzette (thin pancakes), pizza crust, scrambled eggs, and other food products. The food products are conveyed between a pair of endless heating belts which are heated by upper and lower heating units in the form of heating platens which have variable temperature heating zones so arranged that the cooking temperature is varied as the food product moves through the variable temperature heating zones. The upper heating unit includes front and rear upper heating platens which are vertically adjustable with the upper heating belt relative to the lower heating unit or platens and heating belt to provide for food products of varying sizes and thicknesses and the front and rear upper heating platens may be tilted relative to the horizontal so that as the food product moves progressively through the grill from front to rear and shrinks in size due to the cooking operation the front and rear upper heating platens and the upper heating belt will be disposed in the most advantageous heating position relative to the lower heating belt and heating unit or platens. The endless heating belts are designed to be nonsticky and to provide for rapid heat transfer from the heating units or platens to the food products being cooked and for long wear life.

10 Claims, 27 Drawing Figures

INVENTOR.
JAMES D. NORRIS

COOKING GRILL

OBJECTS

An object of the invention is to provide a new and improved electrically heated cooking grill for the rapid cooking of cheese sandwiches, hamburgers, french toast, bacon, pancakes, crepe suzette (thin pancakes), pizza crust, scrambled eggs, and other food products by heat conduction to both sides of the food product.

A further object of the invention is to provide a new and improved electrically heated cooking grill which embodies a frame structure which includes an upper vertically adjustable frame unit and a lower and relatively stationary frame unit; an upper endless heating belt and front and rear upper heating platens mounted on the upper and vertically adjustable frame unit; a lower and relatively stationary frame unit having an endless conveyor-heating belt and lower heating platens mounted therein; and means for adjusting the upper supporting frame unit and the front and rear upper heating platens and the upper endless heating belt relative to the lower and relatively stationary frame unit and endless conveyor heating belt and lower heating platens so that the cooking space between the endless heating belts may be adjusted to the size and cooking requirements of various food products which may be cooked therein.

A further object of the invention is to provide a new and improved grill for cooking products embodying a pair of endless heating belts and heating platens therefor which provide variable temperature heating zones so that as the food products move from front to rear through the grill between the endless heating belts the temperature in the heating zones will conform to the cooking requirements of the food product being cooked, being higher in the first stages of cooking, and lower in the latter stages of the cooking operation after the food products have been partially cooked.

An additional object of the invention is to provide in the new grill a novel construction and arrangement of the front and rear upper heating platens and novel means for tilting them relative to the lower heating platens.

A further object of the invention is to provide in the new cooking grill a pair of endless heating conveyor belts by which the food products are conveyed through the grill and which provide for rapid transfer of heat by conduction from the upper and lower heating platens to the food products so that the food products are rapidly cooked by conduction from both sides thereof as they are conveyed through the grill by the endless conveyor and heating belts and from which the cooked food products may be readily removed due to the nonsticky nature of the endless conveyor and heating belts.

Other objects will appear hereinafter.

DETAILED DESCRIPTION OF STRUCTURE

Figure 1:
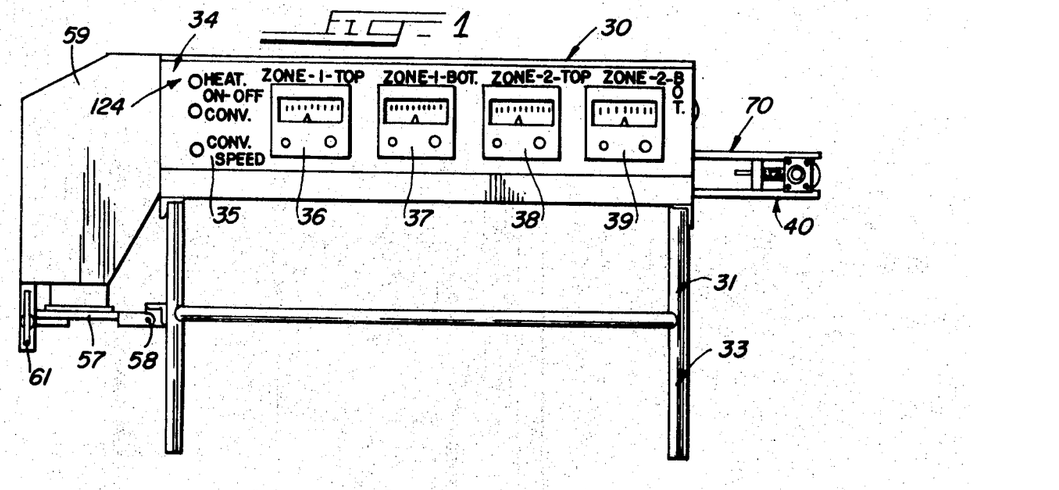
FIG. 1 is a side elevational view of a grill embodying the present invention.
Figure 2:
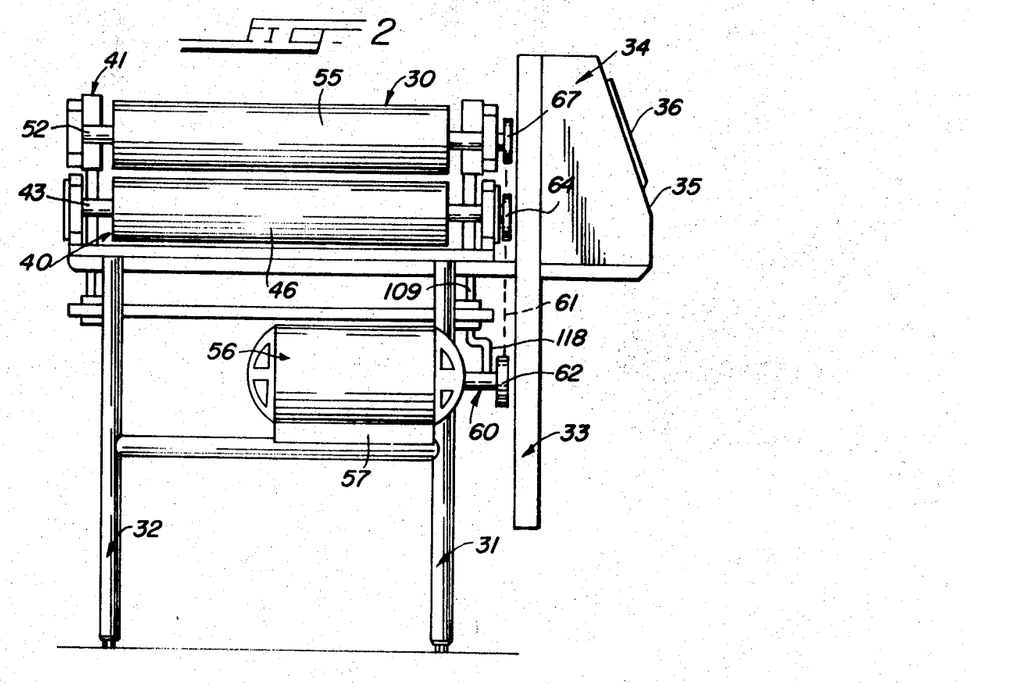
FIG. 2 is an end elevational view thereof as seen from the left-hand end in FIG. 1.

A typical and preferred embodiment of the new electrically heated cooking grill is illustrated in the drawings, wherein it is generally indicated at 30, and comprises a supporting frame 31 which includes a main supporting frame structure 32 and an auxiliary frame structure 33 which is offset laterally at the front side of the main supporting frame structure 32 (FIG. 2). A control instrument housing 34 is mounted on the auxiliary frame structure 33 and includes a front instrument and temperature control panel 35. A plurality of electrical temperature control instruments (shown as four) 36, 37, 38 and 39 (FIG. 1) are mounted in the instrument housing 34 and may be of any type suitable for controlling the temperatures of the upper and lower heating platens units, which are embodied in the invention, and which will be described hereinafter, and for this purpose thermocouple sensor temperature control units manufactured by Barber Coleman Co., Rockford, Illinois, Model 180, have been found satisfactory.

It will be noted, in this connection, and as shown in FIG. 1, that the temperature control instruments 36, 37, 38 and 39 are arranged in four temperature or heating zones, in relation to the two upper and two lower heating platens which they control, namely, Zone 1-Top 36; Zone 1-Bottom 37; Zone 2-Top 38; and Zone 2-Bottom 39.

Figure 3:
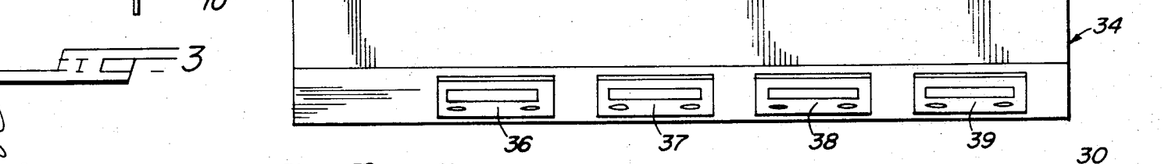
FIG. 3 is a top plan view of the grill shown in FIGS. 1 and 2.

The new cooking grill 30 includes a lower or bottom frame unit 40 which is mounted on and is rigidly attached to the upper end portion of the main supporting frame structure 32, and an upper and relatively movable frame unit 41 which is adjustably mounted on the main supporting frame structure 32 above the lower or bottom supporting frame unit 40 (FIGS. 2, 4, 5, 6, 24 and 25). A pair of generally cylindrical front heating belt guide rollers 42 are mounted on a horizontal shaft 43 which is rotatably journaled in the lower or bottom supporting frame unit 40 adjacent the front or food intake end of the new cooking grill 30 (left-hand end, FIGS. 3, 4 and 5) and a similar pair of cylindrical guide rollers 44 are rotatably mounted on a horizontal shaft 45 which is rotatably journaled in the lower or bottom supporting frame unit 40 adjacent the food outlet end of the new cooking grill 30 (right-hand end, FIGS. 3, 4 and 5). An endless combination conveyor and heating belt 46 is carried by the lower or bottom and relatively stationary supporting frame 40 and works around the generally cylindrical belt guide rollers 42 and 44. Each of the generally cylindrical belt guide rollers 42 and 44 has a friction-enhancing coating 47 on the outer peripheral surface thereof (FIG. 6) and for this purpose any silicone rubber resin coating is suitable.

Figure 6:
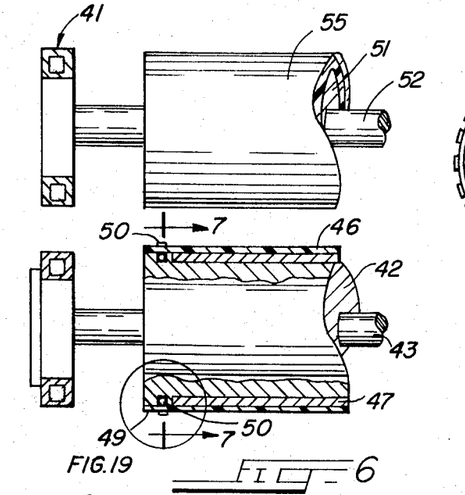
FIG. 6 is an enlarged fragmentary sectional view showing the construction and mounting of the upper and lower heating and conveyor belts embodied in the invention.
Figure 7:
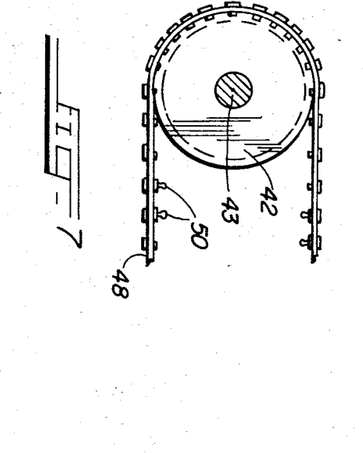
FIG. 7 is a fragmentary detail view partly in section and partly in elevation of one of the heating and conveyor belts embodied in the invention.
Figures 18, 19, 20, 21, 22, 23:
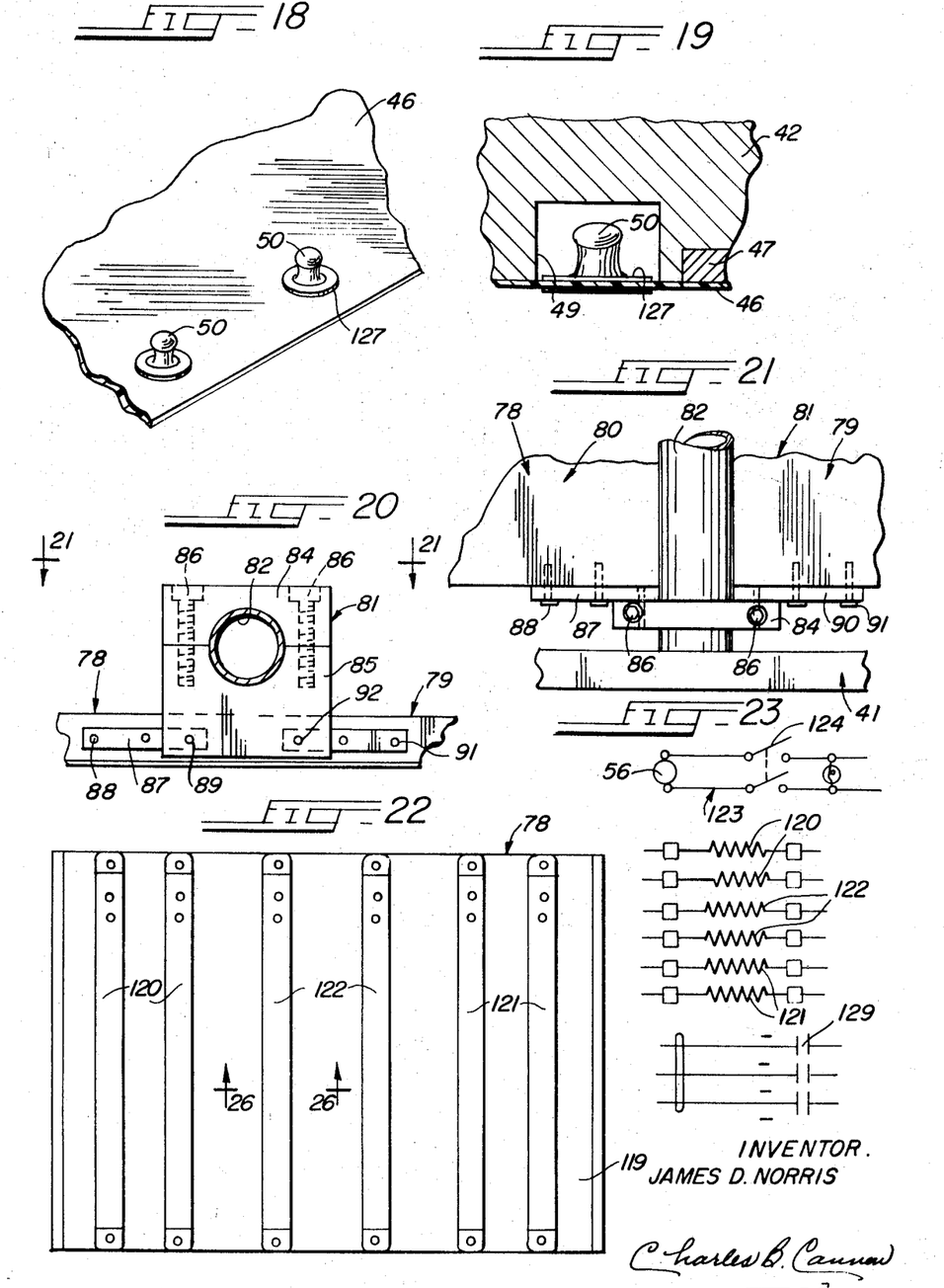
FIG. 18 is a fragmentary perspective view illustrating the construction of the heating and conveyor belts embodied in the invention.
FIG. 19 is an enlarged fragmentary sectional detail view of the area encircled in FIG. 6 showing the construction of the heating and conveyor belts and the belt rollers therefor embodied in the invention.
FIG. 20 is a fragmentary elevational view of the area encircled in FIG. 12 illustrating the pivotal mounting of the front and rear upper heating and conveyor belt and heating platens relative to the lower heating and conveyor belt and heating platens.
FIG. 21 is a top plan view on line 21—21 in FIG. 20.
FIG. 22 is a bottom plan view of one of the heating platens embodied in the invention.
FIG. 23 is a diagrammatic view illustrating part of the electrical circuit in which the heating elements embodied in the heating platens shown in FIG. 22 are arranged.

As shown in FIGS. 6, 7 and 19, each of the bottom belt guide rollers 42 and 44 has a pair of annular grooves 49 formed in the outer peripheral surface thereof, one adjacent each axial end of each of the belt guide rollers 42 and 44, and the endless combination conveyor and heating belt 46 has a row of spaced belt studs or lugs 50 mounted therein adjacent each lateral side of the lower or bottom combination conveyor and heating belt 46 (FIGS. 6, 7, 18 and 19).

The lower combination conveyor and heating belt 46 may be made of any suitable material but a preferred material for this purpose is a belt composed of glass fiber (FIBERGLASS) (Owens-Corning Glass Co.) coated with a heat-resistant resinous material which is preferably polymerized tetrafluoro ethylene known as TEFLON, such a combination conveyor and heating belt having high-heat-resistance, long wear life and providing for rapid heat transfer therethrough by conduction and providing a nonsticky surface on the combination conveyor and heating belts 46-55.

The upper and relatively movable frame unit 41 has a pair of front and rear horizontal and generally cylindrical belt guide rollers 51 and 53 mounted therein on the front and rear horizontal shafts 52 and 54, respectively, which are rotatably journaled in the upper and relatively movable frame unit 41; the front and rear upper belt guide rollers 51 and 53 being similar in construction to the front and rear lower belt guide rollers 42 and 44, respectively, on the lower or bottom frame unit 40. An upper combination endless conveyor and heating belt 55, which is similar to the lower or bottom endless conveyor and heating belt 42, is mounted on and works around the upper front and rear belt guide rollers 51 and 53 (FIGS. 2, 3, 4, 5 and 6).

Figure 4:
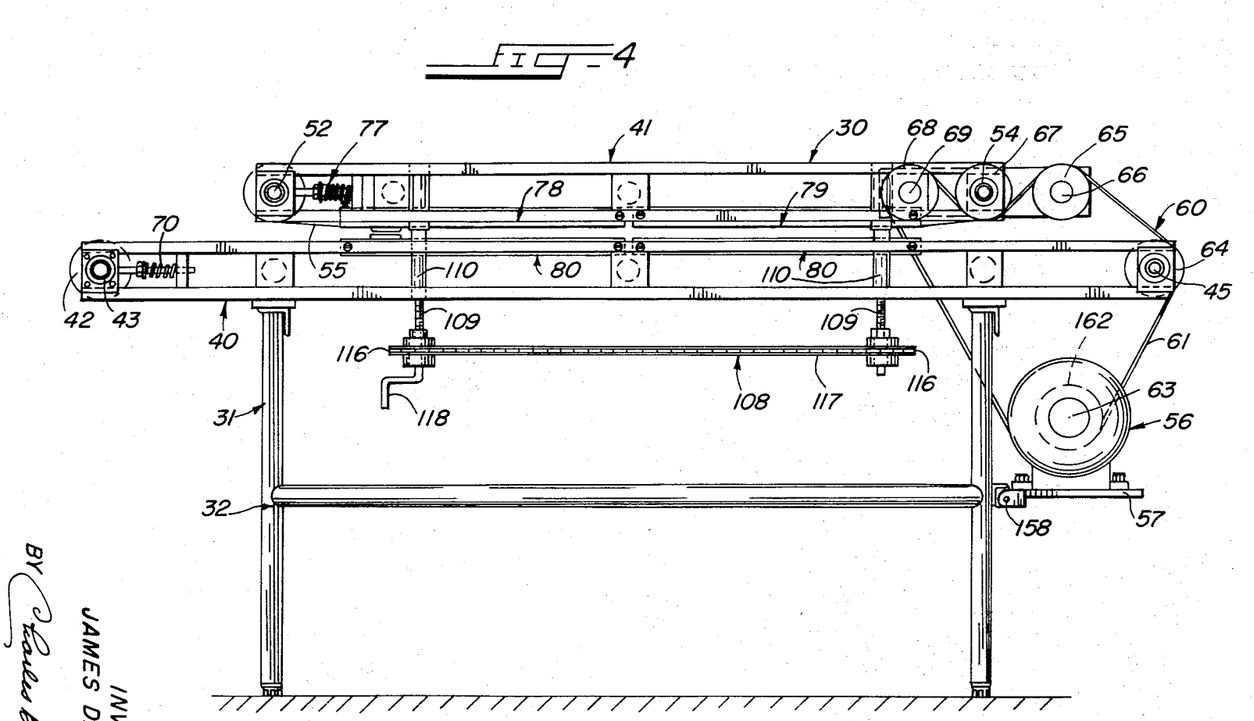
FIG. 4 is a side elevational view on line 4—4 in FIG. 3.

The upper and lower combination heating and conveyor belts 55 and 46, respectively, are driven by an electrical driving motor unit which is generally indicated at 56, and which is mounted on a supporting shelf or bracket 57 which, in turn, is hingedly mounted, as at 58, on the main supporting frame structure 52 at one end thereof (FIGS. 1, 2 and 4); a suitable housing 59 being removably mounted on the main supporting frame structure 32 for the motor drive unit 56. A power transmission device, generally indicated at 60, is operatively associated with the motor drive unit 56 for operating the endless conveyor and heating belts 46 and 55. This power-transmission device 60 includes a flexible power-transmission belt 61 which works around a bottom belt pulley 62 which is mounted on the shaft 63 of the driving motor 56; and the driving belt 61 also works around a drive pulley 64 which is carried by the supporting shaft 43 from the lower front belt guide roller 42. The driving belt 61 likewise is rotatably journaled in the upper supporting frame unit 41. The drive belt 61 further works around a driving pulley 67 which is attached to the supporting shaft 54 for the upper rear belt guide roller 53, and the driving belt 61 also works around an idler pulley 68 which is attached to a pulley shaft 69 which is rotatably journaled in the upper and relatively movable frame unit 41 (FIG. 4).

Figure 10:
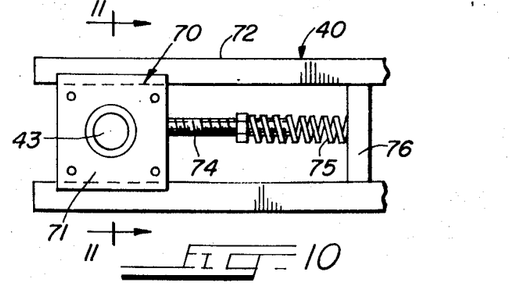
FIG. 10 is a fragmentary side elevational view illustrating the means embodied in the invention for tensioning the heating and conveyor belts.
Figure 11:
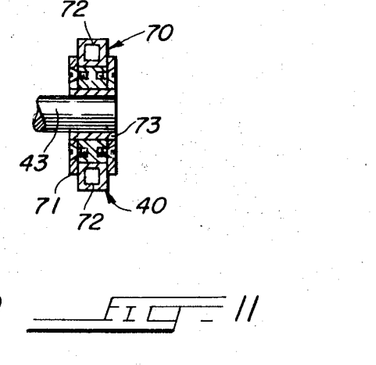
FIG. 11 is a transverse vertical sectional view on line 11—11 in FIG. 10.

A belt tensioning device, generally indicated at 70, is mounted on one end portion of the lower and relatively stationary frame unit 40, in conjunction with the front lower supporting shaft 43 for the front lower belt guide roller 42, for tensioning the lower endless combination conveyor and heating belt 46. As shown in FIGS. 4, 10 and 11 the belt-tensioning device 70 comprises a slidable bearing block assembly 71 which is slidably and adjustably mounted on and guided by a pair of spaced upper and lower supporting members 72 which form part of the lower and relatively stationary supporting frame unit 40; the bearing block assembly being mounted on the front lower belt guide roller shaft 43 (FIGS. 7 and 10). As best shown in FIG. 10, the slidable and adjustable bearing block assembly 71 is adjustably mounted on a screw member 74. One end portion of a spring-tensioning member 75 is attached to the screw member 74 and the other end portion of the spring-tensioning member 75 is attached to a supporting block 76 which is rigidly mounted on and extends between the supporting frame members 72 (FIG. 10). As shown in FIG. 4, a similar belt-tensioning device 77 is mounted on the upper and relatively movable frame unit 41, in conjunction with the upper front belt guide roller shaft 52, for tensioning the upper endless conveyor and heating belt 55.

Figure 12:
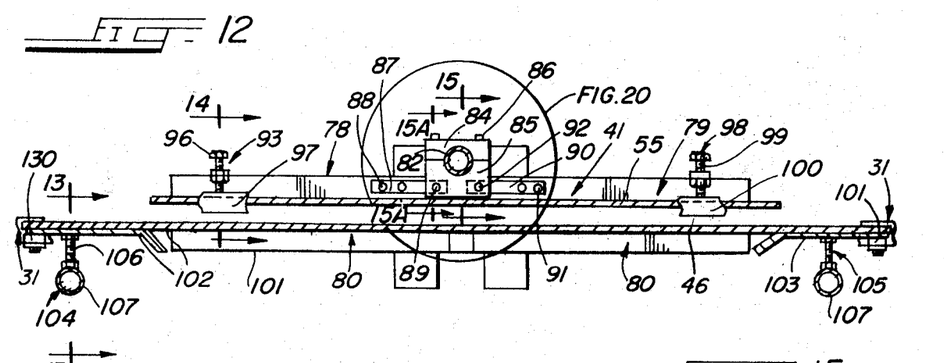
FIG. 12 is a fragmentary longitudinal vertical sectional view illustrating the arrangement of the upper and lower heating and conveyor belts embodied in the invention and the mounting of the upper conveyor and heating belt and the upper heating platens.
Figure 13:
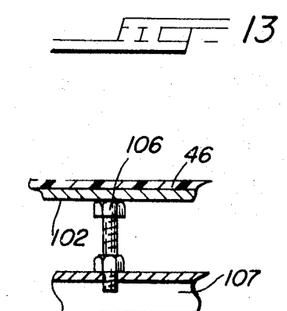
FIG. 13 is a sectional detail view on line 13—13 in FIG. 12 illustrating the means embodied in the invention for tilting the lower frame unit and the lower heating and conveyor belt and platens.
Figure 15:
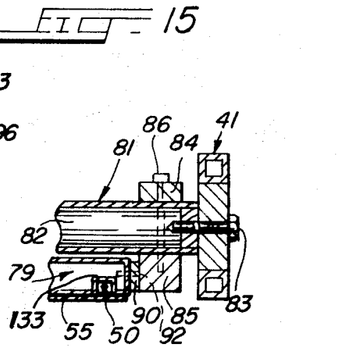
FIG. 15 is a sectional detail view on line 15—15 in FIG. 12 illustrating the means embodied in the invention for the pivotal mounting of the front and rear upper heating platens.
Figure 15A:
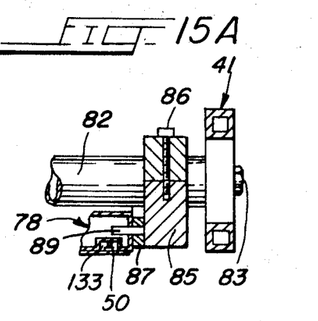
FIG. 15A is an enlarged sectional detail view on line 15A—15A in FIG. 12.

The new cooking grill 30 includes a pair of front and rear upper heating platen units which are generally indicated at 78 and 79, respectively, for heating the upper endless conveyor and heating belt 55, and a pair of lower heating platen units 80 for heating the lower endless conveyor and heating belt 46 (FIGS. 12 and 13). As shown in FIGS. 12, 15, 15A, 20 and 21 the inner end portions of the front and rear upper heating platen units 78 and 79 are rockably or pivotally mounted in a pivotal mounting structure, which is generally indicated at 81, and which includes a horizontal shaft 82 having end portions which are attached, as at 83, to the movable upper supporting frame unit 41 (FIGS. 15 and 15A). A pair of upper and lower clamping collar members 84 and 85 are mounted on the end portions of the shaft 82 and are attached together by suitable bolts 86. The front upper platen 78 has a mounting strip member 87 attached thereto, as at 88, and this mounting strip member 87 is pivotally mounted, as at 89, on the lower clamping collar member 85. Similarly, the upper rear heating platen unit 79 has a mounting strip member 90 attached thereto, as at 91, and the inner end portion of the mounting strip member 90 is pivotally mounted, as at 92, on the lower clamping collar member 85 of the pivotal mounting unit 81 (FIGS. 12, 15, 15A, 20 and 21).

Figure 14:
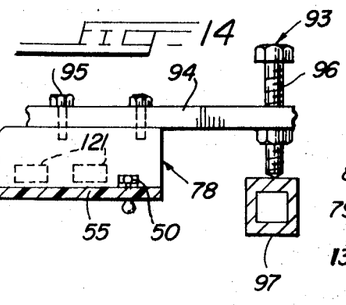
FIG. 14 is a sectional detail view on line 14—14 in FIG. 12 illustrating the means embodied in the invention for tilting the upper heating platens and the upper heating and conveyor belt.

The top front heating platen unit 78 has its front or outer end portion tiltably or adjustably mounted relative to the movable upper supporting frame unit 41, by adjustable mounting means, generally indicated at 93 (FIGS. 12 and 14) and which includes a supporting arm member 94 which is attached, as at 95, to the front or outer end portion of the front upper heating platen unit 78. The supporting arm member 94 has an adjustment screw member 96 adjustably mounted thereon and this adjustment screw member 96 bears at its lower end on a horizontally extending stationary supporting member 97 of the stationary supporting frame unit 32 (FIGs. 12 and 14). Similarly, the rear end portion of the upper rear heating platen unit 79 is tiltably or adjustably mounted on and relative to the upper supporting frame unit 41 by adjustable mounting means, generally indicated at 98, and which includes an adjustment screw member 99 which bears at its lower end on a horizontally extending stationary supporting member 100 of the stationary supporting frame unit 32 (FIG. 12).

The two lower heating platen units 80 are mounted below the bottom endless conveyor and heating belt 46 and a panlike support 102 is provided below the belt 46 at the intake end of the grill 30 and is attached, as at 130, to the main supporting frame structure 32 (FIG. 12). This panlike support 102 for the lower endless conveyor and heating belt 46 provides a flat shelflike support for the bottom endless conveyor and heating belt 46 at the intake end of the new cooking grill so that food products (FP) (FIG. 17) may be readily inserted into the cooking grill 30 at the intake end thereof between the upper and lower endless conveyor and heating belts 55 and 46, respectively (FIG. 12).

Figure 24:
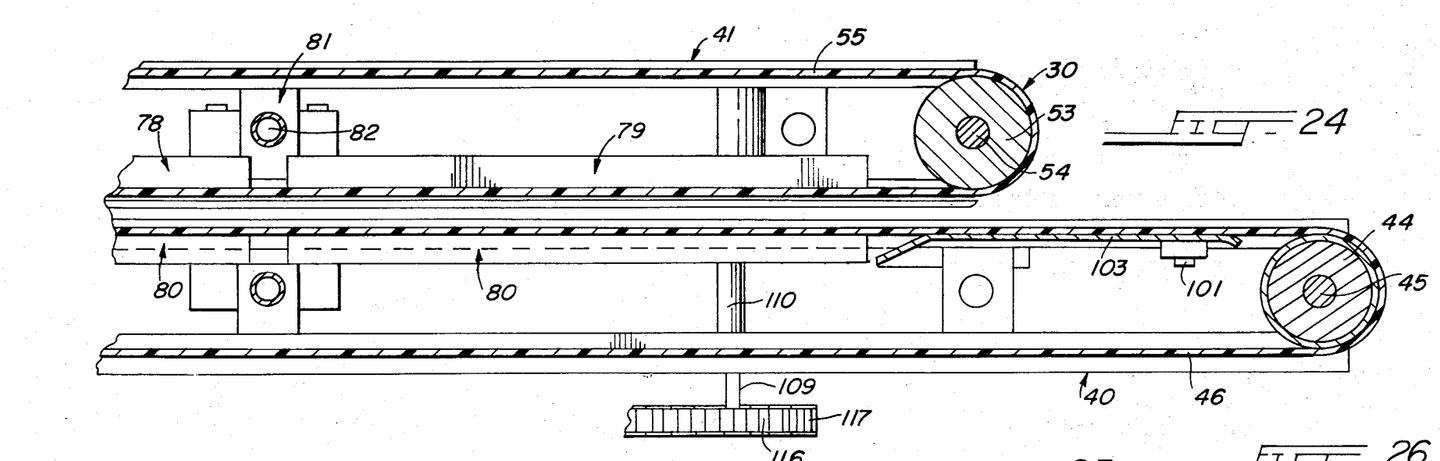
FIG. 24 is an enlarged sectional view of the structure shown in the right-hand side of FIG. 5.

Similarly, a panlike support 103 is provided for the bottom conveyor and heating belt 46 at the outlet or delivery end thereof and is attached to the main supporting frame structure 32, as at 101, (FIGS. 12 and 24).

It will be noted (FIGS. 12 and 13) that the panlike supports 102 and 103 are supported by means of a pair of similar supporting devices 104 and 105 which are disposed below the panlike supports 102 and 103, respectively, for the bottom conveyor and hating belt 46. Each of the supporting devices 104 and 105 includes a bolt member 106 which bears at its upper end against one of the supports 102 and 103 and the lower end portion of each of the bolt members 106 is mounted on a stationary transversely and horizontally extending supporting member, as 107, of the stationary supporting frame structure 32 (FIGS. 12 and 13).

Figure 8:
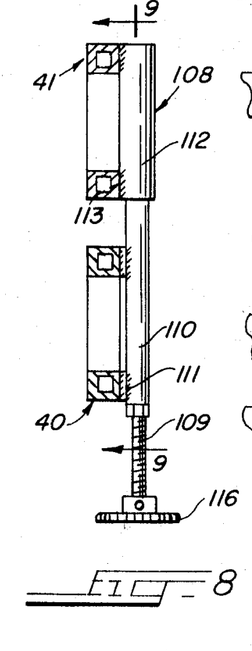
FIG. 8 is a sectional detail view illustrating the means embodied in the invention for vertically adjusting the upper frame unit and the upper heating and conveyor belt and the upper heating platens relative to the lower frame unit and the lower heating and conveyor belt and lower heating platens.

The movable upper frame unit 41 and the upper endless conveyor and heating belt 55 and the upper front and rear heating platen units 78 and 79, and associated parts carried thereby, are vertically adjustable relative to the bottom endless conveyor and heating belt 46 and relative to the bottom heating platen units 80 associated therewith. This relative adjustment of the aforesaid parts is accomplished by means of an adjusting device, generally indicated at 108 (FIGs. 4, 8 and 9), and which includes a pair of vertically extending screw members 109 which are arranged in spaced relationship on the main supporting structure 32, each of the vertically extending adjusting screw members 109 being mounted in a vertically extending stationary tubular guide member 110 which is rigidly attached, as at 111, to the bottom stationary frame unit 40 (FIGS. 8 and 9).

Figure 9:
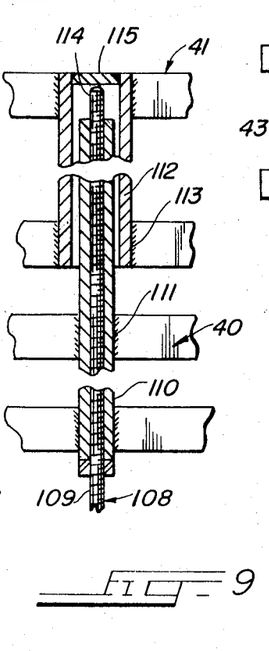
FIG. 9 is a central vertical sectional view on line 9—9 in FIG. 8.

An internally threaded nut member 125 is threadably mounted on the lower end portion of each of the adjustment screw members 109 and each of the internally threaded nut members 125 is rigidly attached to the lower end portion of the corresponding one of the stationary tubular guide members 110 (FIG. 9). The upper end portion of each of the vertically extending adjustment screw members 109 projects upwardly through a second and upper tubular member 112 which is of larger diameter than the lower tubular guide member 110 and each of the larger and upper tubular guide members 112 is rigidly attached, as at 113, to the relatively movable upper frame unit 41 (FIGS. 8 and 9). The upper end portion 114 of each of the vertically extending adjustment screw members 114 projects upwardly above the inner and smaller diameter tubular guide member 110 and engages the top wall 115 of the outer and smaller diameter tubular guide member 112 (FIG. 9). A sprocket gear 116 is mounted on the lower end portion of each of the adjusting screw members 109 and a sprocket chain 117 operatively interconnects the sprocket gears 116 and is manually operable by a handcrank member 118 which is carried by one of the adjusting screw members 109 (FIG. 4).

The two upper heating platen units 78 and 79 and the two lower heating platen units 80 are all of substantially the same general design and construction which is shown in FIGS. 15, 15A, 22 and 26, and comprises a generally rectangular-shaped metal panel which is preferably aluminum or stainless steel, in which the electrical resistance heating elements 120-121-122 are mounted. The electrical resistance heating elements are preferably sheathed resistance strip heating elements which are arranged in two end pairs 120 and 121 which are arranged relatively close to each other and a middle pair of resistance strip heating elements 122 which are spaced further from each other than are the heating elements in the end pairs 120 and 121 for a reason which will be pointed out hereinafter. The pairs of electrical resistance heating elements 120-121-122 for each of the heating platen units 78-79-80-80 are arranged in an electrical circuit, which is diagrammatically illustrated in FIG. 23, wherein it is generally indicated at 123, and which includes a manually operable switch control unit 124 for controlling circuit to the conveyor-operating motor 56 and relay controls or magnetic contacts 129 for the heating elements 120-121-22 of the heating platen units 78, 79, 80-80 (FIGS. 1 and 23); the relays 129 being under control of a suitable start-stop switch 134 on the instrument panel 35 (FIG. 1).

Figures 25, 26:
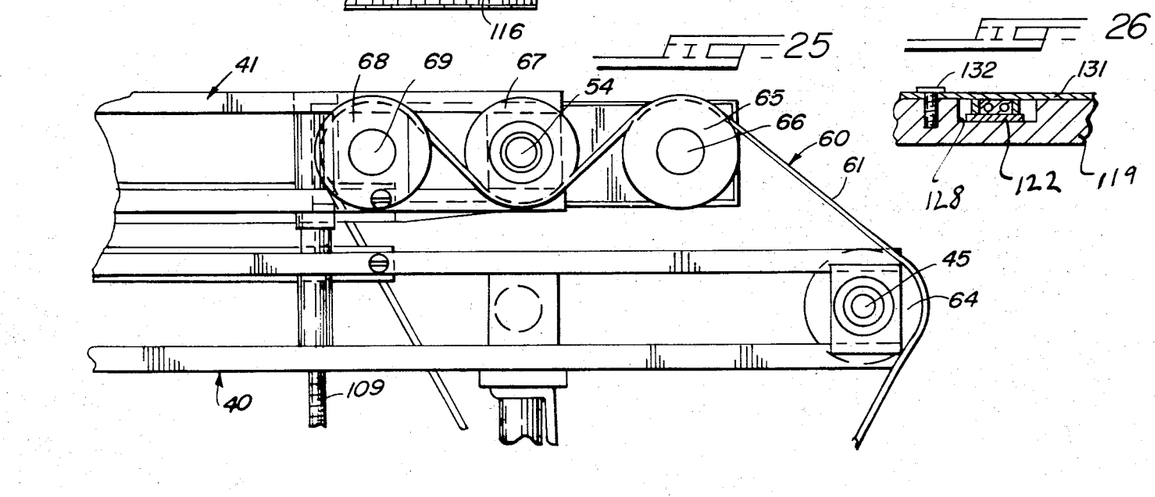
FIG. 25 is an enlarged fragmentary view of the structure shown in the right-hand side of FIG. 4.
FIG. 26 is a sectional detail view on line 26—26 in FIG. 2 showing the mounting of one of the strip heater elements in the heating platens.

As shown in FIG. 26, each of the resistance strip heating elements 120-121-122 is mounted in a groove or slot 128 which is formed in the aluminum or stainless steel-supporting base member 119 of the heating platen unit and a cover plate 131 is arranged over the grooves 128 and the heating elements 120-121-22 and is attached to the base member 119 of the platen as at 132 (FIG. 26).

As shown in FIGS. 15, 15A and 26 the lugs or studs 50 on the endless conveyor and heating belts 46 and 55 project into and work in channel-shaped grooves 133 (FIGS. 15 and 15A) which are formed in the marginal edge portions of the base members 119 of the heating platens 78-79-80-80 so as to prevent sidewise or lateral movement of the conveyor and heating belts 46 and 55 relative to the heating platens, in use.

The heating platen units 78-79-80-80 may be of any desired and required size and heating capacity but a typical size is 20 inches in length by 24 inches in width.

Likewise, the endless conveyor and heating belts 46 and 55 may be of any desired length and width and the driving means 56-60 therefor may be of any desired power and speed. However, it has been found that for most cooking or grill operations the speed of the endless conveyor and heating belts 46 and 55 is preferably from 1 to 6 linear feet per minute, with an optimum speed of 3.3 linear feet per minute, and that the temperature of the endless conveyor and heating belts 46 and 55 is preferably in the order of from 500° F. with variations therein provided for by the heating zones indicated in FIG. 1.

OPERATION

In the use and operation of the new cooking grill the relatively movable upper frame unit 41 and the upper endless conveyor and heating belt 55 and the upper front and rear heating platen units 78 and 79, respectively, mounted thereon, may be vertically adjusted relative to the lower and stationary frame unit 40 and the lower endless conveyor and heating belt 46 and the lower heating platen units 80 mounted thereon by manually operating the handcrank 118 which acts, through the sprocket gears 116 and the sprocket chain 103, to rotate the vertically extending adjustment screws 109 in and relative to the stationary threaded units 125 and the smaller diameter tubular guide members 110 which are rigidly attached to the lower and stationary frame unit 40 (FIGS. 8 and 9). This motion causes the upper end portions 114 of the screw members 109 to engage the top walls 115 of the upper and larger diameter tubular guide members 112 which are attached to the upper and movable frame unit 41, thereby raising the upper movable frame unit 41 and the upper endless conveyor and heating belt 55 and the upper front and rear heating platen units 78 and 79, respectively, relative to the lower and stationary frame unit 40 and the lower endless conveyor and heating belt 46 and the lower heating platen units 80 mounted thereon. In this manner the upper endless conveyor and heating belt 55 and the front and rear upper heating platen units 78 and 79, respectively, may be raised to and spaced from the lower endless conveyor and heating belt 46 to adjust the conveyor and heating belts 46 and 55 and the spacing thereof relative to each other to the requirements of the size, thickness, etc., of the food products "FP" which are to be cooked or grilled therein since some food products require greater spacing of the endless conveyor and heating belts 46 and 55 and the heating platen units 78–79–80–80 relative to each other, than do others.

Figure 16:
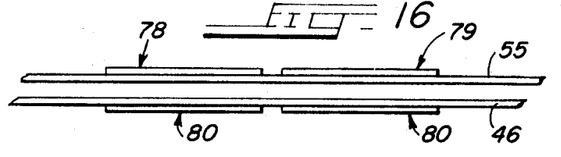
FIG. 16 is a schematic view illustrating the arrangement of the upper and lower heating and conveyor belts and the heating platens embodied in the invention.
Figure 17:
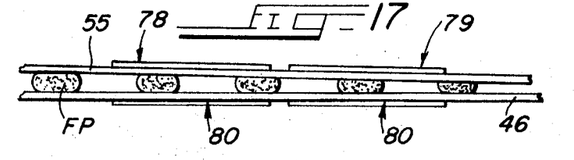
FIG. 17 is a schematic view illustrating the manner in which the front and rear upper heating platens and the upper heating and conveyor belt are tilted in relation to the lower heating and conveyor belt and heating platens as the food product is moved through the grill during the cooking operation.

Likewise, the front and rear upper heating platen units 78 and 79, respectively, may be adjusted or tilted into any desired angle to allow for shrinkage of the food products being cooked as they pass from the intake end of the grill 30 and between the front upper heating platen unit 78 and the lower heating platen units 80 toward the outlet end of the grill (left to right, FIGS. 3, 5, 16 and 17) and to a position under and between the top rear heating platen unit 79 and the lower rear heating platen unit 80; it being known that some food products will shrink more than others during the cooking or grilling operation. As indicated hereinbefore, this adjustment for the angular position or tilt of the front and rear upper heating platens 78 and 79 is effected by manipulating the adjustment screw members 93–96 and 98–99, respectively upon and relative to the stationary frame members 97 and 100, respectively which causes the adjustment screw members 93–96 and 98–99 to raise or lower the supporting arm members 94 on which the adjustment screw members 93–96 and 98–99 are mounted, thereby causing the front and rear upper heating platen units 78 or 79 to pivot or rock as at 89 and 90 on the mounting strip members 87 and 90, respectively, and on the clamping collar member 85 upon and relative to the tubular-supporting member 82 and relative to the movable upper frame unit 41 (FIGs. 12, 14, 15 and 15A) into the desired angular or tilted position (FIGS. 16 and 17).

When it is desired to operate the new cooking grill 30 the electrical operating circuit 123 for the driving motor 56 may be energized by closing the switch 124 (FIGS. 1 and 23) and the electrical circuit to the relays 129 and the strip heating elements 120–121–122 in the heating platen units 78, 79, 80 and 80 may be closed by manipulating the start-stop switch 134 on the front instrument panel 35 (FIGS. 1 and 23) whereupon current will be supplied to the relays 129 and to the resistance strip heating elements 120–121–122 in the heating platen units 78–79–80–80 while, at the same time, the driving motor 56 will be energized and power will be transmitted from the driving motor 56, by way of the motor shaft 63, drive pulley 62 thereon, driving belt 61, driving pulley 64, shaft 45, idler pulleys 65 and 67, drive pulley 68 and shaft 69, thereby rotating the upper and lower rear belt guide rollers 53 and 44, respectively, and thus causing the upper and lower combination conveyor and heating belts 55 and 46, respectively, to be moved in and relative to the upper and lower supporting frame units 41 and 40, respectively. During this operation, the driving belt 61 is tensioned by the weight of the motor drive unit 56 and its hinged mounting at 58 on its supporting shelf or bracket 57 (FIG. 4).

Figure 5:
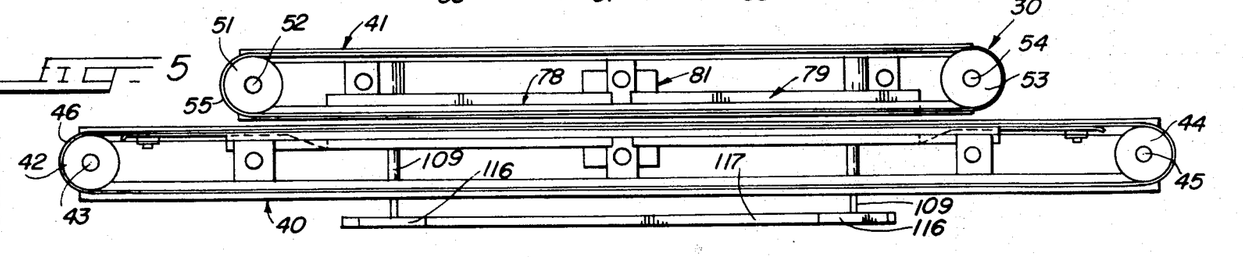
FIG. 5 is a longitudinal sectional view on line 5—5 in FIG. 3.

The food products to be cooked or grilled may then be manually fed into the grill 30 at the intake end thereof and on the upper run of the lower conveyor and heating belt 46 above the apronlike supporting end portion 102 of the panlike housing 101 for the lower heating platen units 80 (left-hand end, FIGS. 5 and 12). The food products thus fed into the new cooking grill 30 will thereupon be conveyed by the lower and upper conveyor and heating belts 46 and 55, respectively, through the grill 30, between the upper and lower conveyor and heating belts 55 and 46, respectively. During this operation heat will be rapidly transmitted, by conduction, from the heating platen units 78–79–80–80 through the conveyor and heating belts 55 and 46 to the food products to cook or grill the latter. During this travel through the two top and bottom heating zones which are controlled by the heat control instruments 36, 37, 38 and 39 (FIG. 1) so that heat of relatively greater intensity and relatively higher temperature is applied to the food products in the early stages of the cooking or grilling operation, in heating Zone 1, and heat of lower intensity and lower temperature in heating Zone 2, as the food products become partially cooked or grilled during passage through the grill 30.

During the cooking or grilling operation the strip heating elements 120–122–121 in the heating platen units 78–79–80–80 transfer heat rapidly by conduction through the combination conveyor and heating belts 46 and 55, which are thus rapidly heated so that the cooking or grilling of the food products is effected simultaneously from both sides thereof, that is, from the top and bottom of the food products, thus enhancing the cooking of the food products and the resulting taste thereof. It will be noted, in this connection, that the strip heater elements 120–122–121 are arranged in pairs in the heating platen units (as 78, FIG. 22) with the central strip heating elements 122 being spaced further apart than the end strip heating elements 122 so that relatively more heat is supplied to the combination conveyor and heating belts 46 and 55 in the end portions thereof where the loss of heat by radiation is greater than in the center or middle areas of the belts 46 and 55 where loss of heat by radiation is relatively less.

During the conveying and cooking operation the combination conveyor and heating belts 46 and 55 are tensioned by the belt tensioning devices 70 and 77, respectively, the tension of which may be adjusted as needed.

As the combination conveyor and heating belts 46 and 55 and the food products carried and heated thereby are thus moved through the grill 30, the belts 46 and 55 are guided and prevented from sidewise or lateral movement upon and relative to the belt guide rollers or cylinders 42–44 and 51–53, respectively, by engagement of the heads of the buttonlike studs or lugs 50 in the annular grooves 49 which are formed in the peripheral surfaces of the guide roller cylinders 42–44–51–53 (FIGS. 15 and 19), and the conveyor and heating belts 46 and 55 are prevented from lateral or sidewise movement relative to the heating platen units 78–79–80–80 by engagement of the studs or lugs 50 on the conveyor and heating belts 46 and 55 in the channel-shaped grooves 113 which are formed in the base members 119 of the heating platen units 78–79–80–80 (FIGS. 15 and 15A). In addition, slipping of the belts 46–55 on the guide roller cylinders 42–44–51–53 is minimized by the silicone resin coatings 47 on the guide roller cylinders 42–44–51–53 (FIG. 6).

The cooked food products may be readily removed from the conveyor and heating belts 46 and 55 by reason of the nonsticky surface coatings thereon, as described above.

It will thus be seen from the foregoing description, considered in conjunction with the accompanying drawings, that the present invention provides a new and improved electrically heated food cooking grill having the desirable advantages and characteristics and accomplishing its intended objects including those hereinbefore pointed out and others which are inherent in the invention.

I claim:

1. An electrically heated food cooking grill comprising
   a. a supporting frame structure;
   b. heat-conductive endless upper and lower heating and conveyor belt members movably mounted in said supporting frame structure in vertically spaced relationship relative to each other and for movement in a generally horizontal plane;
   c. means for moving said heat-conductive endless heat and conveyor belt members so as to move food products therebetween through the said cooking grill;
   d. electrical heating means for heating the said heat-conductive endless upper and lower heating and conveyor belt members as they are moved in and relative to the said food products simultaneously from the top and bottom thereof as the said food products are moved through the said cooking grill; the said electrical heating means including 1. a plurality of upper electrical heating units arranged above and in longitudinally spaced heat-conductive relationship with the said upper endless heating and conveyor belt member; and
2. a plurality of lower electrical heating units arranged below and in longitudinally spaced heat-conductive relationship with the said lower heat-conductive endless heating and conveyor belt member;
e. an upper and relatively movable supporting frame unit movably mounted upon and vertically adjustable relative to the said supporting frame structure;
f. the said heat-conductive endless upper heating and conveyor belt member and the said upper electrical heating units being mounted on and being vertically adjustable with the said upper and movable supporting frame unit relative to the said supporting frame structure and the said lower heat-conductive endless heating and conveyor belt member and the said lower electrical heating units; and
g. adjusting means for vertically adjusting the said upper frame unit and the said upper endless heating and conveyor belt member and the said upper heating units mounted thereon relative to the said supporting frame structure and the said lower endless heating and conveyor belt member and the said lower electrical heating units.

2. An electrically heated food cooking grill as defined in claim 1 in which
a. the said upper electrical heating units have inner end portions adjacent to each other and outer end portions facing away from each other; and in which the said electrically heated food cooking grill includes
b. pivotal mounting means for pivotally mounting the said inner end portions of the said upper electrical heating units upon and for pivotal movement relative to the said upper and relatively movable supporting frame unit; and
c. means coacting with the said outer end portions of the said upper electrical heating units for adjustably pivoting the said upper electrical heating units on the said pivotal mounting means therefor toward and away from the said upper heat-conductive endless heating and conveyor belt member.

3. An electrically heated cooking grill as defined in claim 2 in which
a. the said means for adjustably pivoting the said upper electrical heating units upon the said pivotal mounting means therefor is in the form of manually operable adjustment means.

4. A food cooking grill comprising
a. a supporting frame structure;
b. heat-conductive endless upper and lower heating and conveyor belt members movably mounted in said supporting frame structure in vertically spaced relationship relative to each other and for movement in a generally horizontal plane;
c. means for moving the said heat-conductive endless upper and lower heating and conveyor belt members so as to move food products therebetween through the said food cooking grill;
d. an upper generally flat elongated electrical heating platen arranged in a generally horizontal position above and in heat-conductive contact with the said heat-conductive upper endless heating and conveyor belt member, and a lower and generally flat, elongated electrical heating platen arranged in a generally horizontal position below and in heat-conductive contact with the bottom surface of the said lower heat-conductive endless heating and conveyor belt member for heating the said food products simultaneously by conduction from the top and bottom thereof as the said food products are moved through the said cooking grill by the said heat-conductive upper and lower endless heating and conveyor belt members.

5. A food-cooking grill as defined in claim 4 which includes a. a plurality of the said upper generally flat elongated electrical heating platens arranged in generally coplanar horizontal relationship with each other above and in heat-conductive contact with the said upper endless heating and conveyor belt member; and which includes
b. a plurality of the said lower generally flat, elongated electrical lower heating platens arranged in generally coplanar horizontal relationship below and in heat-conductive contact with the said lower endless heating and conveyor belt member.

6. A food cooking grill as defined in claim 5 in which
a. the said upper heat-conductive endless heating and conveyor belt member includes a lower run having a generally flat upper surface; and in which each of the said upper heating platens is in the form of
b. a generally flat, elongated, upper electrical heating platen disposed above and in generally parallel relationship with and in heat-conductive contact with the said generally flat upper surface of the said lower run of the said upper heat-conductive endless heating and conveyor belt member; and in which the said lower heat-conductive endless heating and conveyor belt member has
1. an upper run having a generally flat bottom surface; and in which
c. each of the said lower heating platens is in the form of a generally flat, elongated electrical heating platen having a generally flat upper surface disposed below and in generally parallel relationship with and in heat-conductive contact with the said bottom surface of the said upper run of the said lower heat-conductive endless heating and conveyor belt member.

7. A food cooking grill as defined in claim 5 which includes
a. an upper and relatively movable supporting frame unit movably mounted upon and vertically adjustable relative to the said supporting frame structure; and in which
b. the said heat-conductive endless upper heating and conveyor belt member and the said upper electrical heating platens are mounted on and are vertically adjustable with the said upper and movable supporting frame unit relative to the said supporting frame structure and the said lower heat-conductive endless heating and conveyor belt member and the said lower electrical heating platens; and which includes
c. adjusting means for vertically adjusting the said upper movable supporting frame unit and the said upper endless heating and conveyor belt member and the said upper electrical heating platens mounted thereon relative to the said supporting frame structure and relative to the said lower endless heating and conveyor belt member and the said lower electrical heating platens.

8. An electrically heated food cooking grill as defined in claim 7 in which
a. each of the said upper electrical heating platens includes
1. an axially outer end portion; and
2. an axially inner end portion; and in which the said electrically heated food cooking grill includes
b. pivotal mounting means for pivotally mounting the said axially inner end portions of the said upper electrical heating platens; and
c. means for tilting the said axially outer end portions of each of the said upper electrical heating platen units upwardly and downwardly upon and relative to the said movable supporting frame unit so as to pivot the said axially inner end portions of the said upper electrical heating platens upon the said pivotal mounting means relative to the said movable supporting frame unit and relative to the said supporting frame structure and relative to the said lower endless heating and conveyor belt member and the said lower electrical heating platens.

9. A food cooking grill as defined in claim 5 in which
a. the said upper and lower endless heating and conveyor belt members have
1. generally parallel side edges; and
b. each of the said electrical heating platens has 1. generally parallel side edges; and in which
c. the said generally parallel side edges of the said electrically heating platens extend generally parallel to the said side edges of the said upper and lower endless heating and conveyor belt members; and in which
d. each of the said upper and lower electrical heating platens includes
   1. a plurality of strip electrical heater elements arranged in spaced parallel relationship relative to each other and extending transversely thereacross relative to the said side edges of the said electrical heating platens and relative to the said side edges of the said upper and lower endless heating and conveyor belt members; and in which
e. each of the said electrical heating elements includes
   1. outer end areas; and
   2. a central area between the said outer and areas; and in which f. the said electrical strip heater elements are spaced relatively further from each other in the said central areas of the said electrical heating platens and relatively closer to each other in the said outer end areas of the said heating platens.

10. A food cooking grill as defined in claim 5 in which
a. the said heat-conductive endless heating and conveyor belt members are composed of
   1. a glass fiber body having thereon
   2. a coating of polymerized tetrafluoro ethylene resin whereby heat is rapidly transferred by conduction through the said heat-conductive endless heating and conveyor belt members from the said electrical heating platens but adhesion to the said heat-conductive endless heating and conveyor belt members of food products conveyed thereby and disposed and grilled therebetween is prevented.

* * * * *